(No Model.)

P. J. FAY.
VELOCIPEDE.

No. 301,702. Patented July 8, 1884.

Attest:
Charles Pickles
Gert. Wheelock

Inventor:
P. J. Fay
By Knight Bros
Attys

N. PETERS. Photo-Lithographer, Washington, D. C.

UNITED STATES PATENT OFFICE.

PATRICK J. FAY, OF EAST ST. LOUIS, ILLINOIS.

VELOCIPEDE.

SPECIFICATION forming part of Letters Patent No. 301,702, dated July 8, 1884.

Application filed April 26, 1884. (No model.)

*To all whom it may concern:*

Be it known that I, PATRICK J. FAY, of East St. Louis, in the county of St. Clair and State of Illinois, have invented a certain new and useful Improvement in Velocipede Attachments; of which the following is a full, clear, and exact description, reference being had to the accompanying drawings, forming part of this specification.

This invention consists in a removable seat for three-wheeled velocipedes or tricycles.

Figure 1:
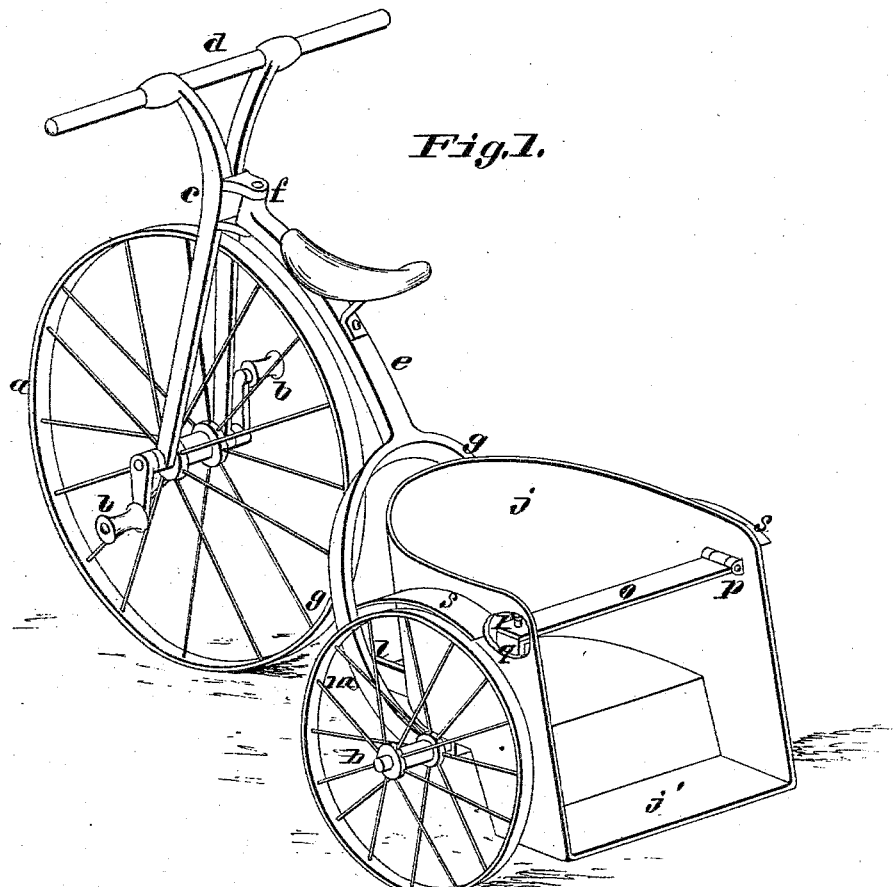
Figure 2:
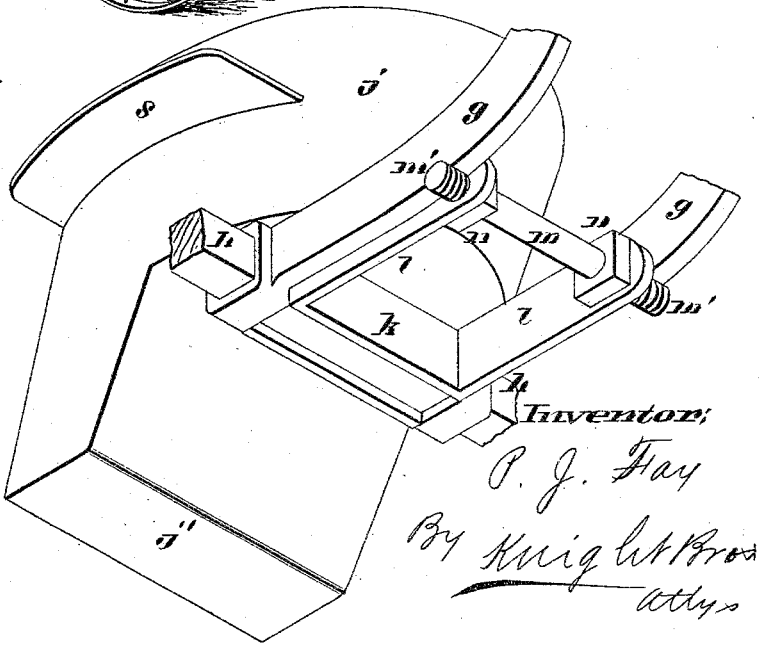

Figure 1 is a perspective view from the rear. Fig. 2 is an enlarged detail under perspective view from the front.

$a$ is the fore wheel with the treadle-cranks $b$.

$c$ is the turn-post frame with cross-handle $d$.

$e$ is the reach to whose fore end the turn-post is hinged at $f$. The reach has at the rear end branches $g$ that are attached to the axle $h$ of the rear wheels, $i$.

No novelty is claimed in the parts of the tricycle proper above described by letter.

$j$ is the seat having a saddle-frame, $k$, fitting on the axle $h$, between the branches $g$ of the reach. The saddle $k$ has two arms, $l$, extending along the inner sides of the branches $g$, so as to prevent the lateral movement of the seat upon the axle, and give means with the bolt $m$ for preventing the upward movement or tilting of the seat. The bolt $m$ is preferably made, as shown, with screw-threaded ends $m'$, upon which are screw-nuts $n$, that bear against the inside of the arms $l$, and press them against the branches $g$. The ends of the bolt $m$ extend beneath the branches $g$, so as to lock the arms down to the branches, and prevent the possibility of the seat tilting over backward off the axle. $o$ is a bar hinged to one side of the seat, and having connection with the other side by means of a lug with a pin engaging a hole in the end of the bar. The hinge is shown at $p$, the lug at $q$, and the pin at $r$. $s$ are guards attached to the side of the seat, and extending over the wheels $i$ to prevent injury to the hands of the person upon the seat, and to take the splash of mud from the wheel.

$j'$ is the foot-rest of the seat.

The bolt $m$, instead of extending beneath the branches of the reach, may pass through holes in the same.

I claim as my invention—

1. A tricycle-seat having a saddle to straddle the axle, formed with arms provided with a bolt to engage beneath the reach branches.

2. The combination, with the seat $j$, of a saddle fitting the axle of a tricycle, with arms upon the saddle extending forward between the branches of the reach, and double-ended bolt passing through the arms and beneath or through the branches of the reach, for the purpose set forth.

PATRICK J. FAY.

In presence of—
BENJN. A. KNIGHT,
GEO. H. KNIGHT.